Nov. 8, 1927.  1,648,016
J. B. FREYSINGER
SNAP HOOK
Filed Dec. 31, 1926
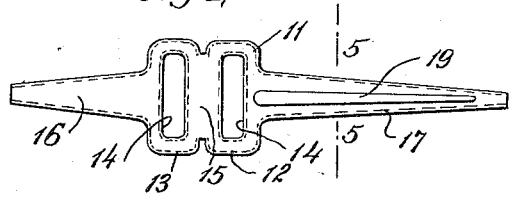
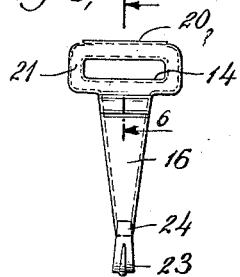
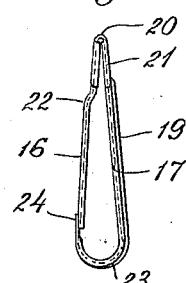
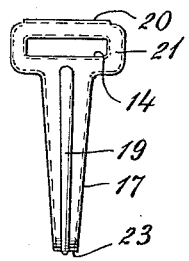
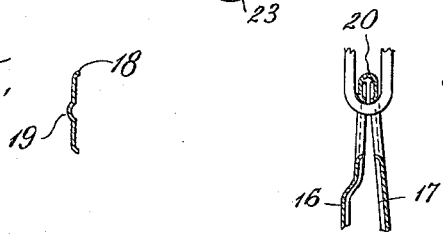
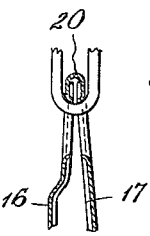
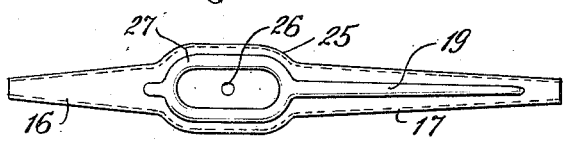
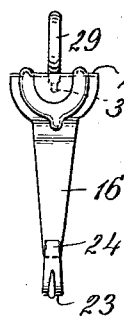
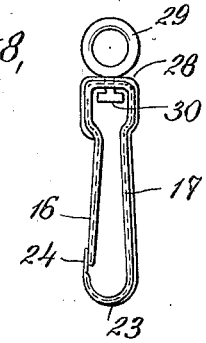
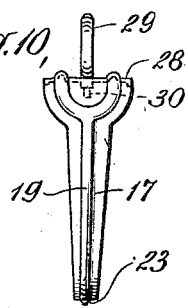
INVENTOR
John B. Freysinger
BY
*Penrose, Owens, Marron & Edmonds*
ATTORNEYS Patented Nov. 8, 1927.

1,648,016

UNITED STATES PATENT OFFICE.

JOHN B. FREYSINGER, OF NEW BRITAIN, CONNECTICUT, ASSIGNOR TO KRISCHER'S MANUFACTURING COMPANY, OF BROOKLYN, NEW YORK, A CORPORATION OF NEW YORK.

SNAP HOOK.

Application filed December 31, 1926. Serial No. 158,187.

This invention relates to a snap hook of simplified construction and of low manufacturing cost, due to the fact that it is made from a single piece of sheet metal which can be shaped to the proper form from a blank by a punching operation. More particularly, the new hook is made from a blank which comprises a body portion provided with means by which the hook may be supported, and end extensions from the body portion which are formed to provide the usual loop.

Snap hooks as heretofore manufactured ordinarily include a body portion having a loop or hook extension, the body portion having a part which is substantially in alignment with the end of the hook, but is separated therefrom. To close this gap a spring leaf or tongue is secured to one end of the body portion and bears against the end of the loop with a slight pressure. When an article is to be supported in the hook, this leaf is forced inwardly so that the end of the hook is cleared, then the article is placed in engagement with the hook and the leaf released, thus closing the loop and preventing the article from being detached from the hook. Snap hooks of this construction are somewhat expensive to manufacture, because they are made of two or more parts, the leaf extension being separate from the main element of the hook and mounted thereon in various ways, each of which requires considerable labor and attention to insure a first-class article.

The object of the present invention is to provide a snap hook which may be manufactured at a greatly reduced cost, due to the fact that it is made of a single piece of sheet metal. This snap hook is punched or otherwise formed from a blank, and then bent to the proper form, the finished article providing the usual loop with a spring portion, which may be opened so that an article may be engaged with the snap hook, as well as affording means for attaching the snap hook to a strap or the like. In addition, the new snap hook is so formed that in the single operation of punching, or otherwise forming the blank from the sheet of metal, the edges of the blank are provided with slightly offset flanges which give these edges a finished appearance and also stiffen and strengthen the hook.

For a better understanding of the invention reference will be made to the accompanying drawings, in which Fig. 1 is a development view of a blank from which one form of hook may be made, Fig. 2 is a side view of the finished hook made from this blank, Fig. 3 is a face view showing the side of the snap hook which may be opened for attachment, Fig. 4 is a view of the other side of the hook, showing stiffening means, Fig. 5 is a sectional view on the line 5—5 of Fig. 1, Fig. 6 is an enlarged sectional view on the line 6—6 of Fig. 3, showing the manner of attaching the hook to a strap or the like, Fig. 7 is a view similar to Fig. 1, but showing a modified form of hook, Fig. 8 is a side view showing the modified form of hook, and Figs. 9 and 10 are front and rear face views of the new hook.

Referring now to the drawings, one form of the hook is made with the blank shown in Fig. 1, this blank having a body portion 11 made of similar parts 12 and 13, each of which has an aperture 14, the parts being united by the connection piece 15 which lies between the apertures 14. The part 13 has an integral extension 16 from one side thereof, and the part 12 likewise has an extension 17 which is considerably longer than extension 16.

The blank 11 is stamped or punched from a sheet of metal and in this punching operation the outer edges of the blank and the edges of apertures 14, are slightly offset, forming offset flanges 18 turned toward one face of the blank. These outer flanges stiffen the snap hook and likewise provide a finished edge therefor, while the flanges at the edges of apertures 14 prevent the cutting of the strap or other attachment, which is inserted through them. The extension 17 likewise may be strengthened by being shaped to channel section, thereby forming a central longitudinal stiffening rib 19.

After the blank is struck from the sheet of metal, the body portion is bent through the connection piece 15, as indicated at 20, to bring the parts 12 and 13 in side-by-side relation, as shown at 21, the apertures 14 then lying in registry with their flanges forming rounded edges as shown in Figs. 3 and 4. The short extension 16 is then preferably given an offset bend, as at 22, and the long extension is then shaped to hook form, as shown at 23, the end of this extension being turned toward the body portion so that it overlies the end of the short extension, as at 24. The short extension then forms the spring leaf which may be forced inwardly to open the loop of the snap hook, so that an article, such as a ring or the like, may be slipped over the hook 23 formed at the end of extension 17. When the short extension 16 is released, its end again contacts with the overlying end 24 of the long extension, so that the hook again returns to its closed loop form.

In some instances it may be desirable to provide the snap hook with a swivel mounting. For this purpose, the hook is manufactured in the shape shown in Figs. 7 to 10. Here the body portion 25 has a central opening 26 and the extensions 16 and 17 from either side of the body portion. The stiffening rib 19 is again employed, and may be extended as at 27 around the body portion to form a ring enclosing the opening 26. The body portion is then bent upon itself at either side of the central opening to form a flat top portion 28 in which the opening 26 lies. The extensions are then bent to proper form, providing the hook 23 as before, with the end of this hook overlying the end of the short extension 16 at 24. An eye 29 may now be attached to the body portion of the hook, this eye being preferably formed of heavy sheet metal and having an end which is passed through the opening 26 and upset as indicated at 30 to hold the eye in place. This eye provides a swivel mounting for the hook, the construction of which is otherwise substantially the same as the hook previously described.

It will be seen that the new hook may be cheaply made, since it is formed of a single piece of metal and in the operation of producing the blank for the hook from the sheet of metal, the edges of the blank are finished by the flange operation, and at the same time these flanges give stiffness and strength. Similarly, the stiffening rib 19 may be formed in the same operation by which the blank is produced. Thereafter the formation of the hook is a simple one of bending which may be carried on by appropriate machines. The new hook can therefore be produced without considerable labor cost and its manufacture does not include assembling operations which must be carried on with care in order to produce a salable article. The snap hook is preferably made of sheet steel, but can be finished to give any surface desired.

I claim:

1. A snap hook made from a single sheet-metal blank, the latter comprising a body portion with a long and a short extension therefrom, the blank adapted to be bent to form flat elongated loop, with the ends of the extensions overlapping at one side of the loop and held in contact by the resilience of the metal, flanges along the sides of the blank for stiffening the latter and providing a finished edge therefor, and a stiffening rib for the blank provided by shaping the long extension to channel section.

2. A snap hook made from a single sheet-metal blank having an offset flange along its periphery for stiffening the blank and providing a finished edge therefor, the blank comprising a body portion with a short and a long extension from opposite sides thereof, the long extension having a stiffening rib, and the blank adapted to be bent upon itself transversely through the body portion to bring the extensions side by side and in diverging relation, with the end of the long extension bent upon itself to overlie the end of the short extension, with these ends held together by the resilience of the metal, whereby pressure may be applied to force the smaller extension inwardly to open the loop.

3. A snap hook made from a single sheet-metal blank folded upon itself to form a flat, elongated, closed loop, the ends of the blank lying in overlapping relation at one side of the loop and the blank having offset flanges along its edges for stiffening the blank and providing a finished edge therefor, one of the extensions being shaped to channel section to provide a stiffening rib.

4. A snap hook made from a single sheet metal blank having a narrow, angularly offset edge flange throughout its periphery to strengthen the blank and give the edge a finish, the blank including a body portion having a pair of similar spaced apertures therethrough, the body adapted to be bent upon itself between the apertures to bring the latter into registry, and extensions from the body adapted to be bent to form an open loop with the ends of the extensions lying in overlapped relation at one side of the loop and held in contact by the resilience of the metal.

5. A snap hoop made from a single sheet metal blank having a narrow angularly offset edge flange throughout its periphery to strengthen the blank and give the edge a finish, the blank including a body portion having a pair of similar spaced apertures therethrough, this body portion adapted to be bent upon itself between the apertures to bring the latter into registry, and extensions from the body adapted to be bent to form an open loop with the ends of the extensions in overlapped relation and held in contact by the resilience of the metal, one of these extensions having a strengthening rib throughout the major portion of its extent.

In testimony whereof I affix my signature.

JOHN B. FREYSINGER.